Nov. 18, 1930. F. S. CARR Re. 17,870

SHIFTABLE NUT FASTENING

Original Filed July 22, 1925

Fred S. Carr Deceased
United Carr Fastener Corporation
Assignee of Fred S. Carr
by Emery Booth Varney & Townsend.
Attys Reissued Nov. 18, 1930

Re. 17,870

UNITED STATES PATENT OFFICE

FRED S. CARR, DECEASED, LATE OF NEWTON, MASSACHUSETTS, BY UNITED-CARR FASTENER CORPORATION, OF CAMBRIDGE, MASSACHUSETTS, ASSIGNEE

SHIFTABLE NUT FASTENING

Original No. 1,694,580, dated December 11, 1928, Serial No. 45,279, filed July 22, 1925. Application for reissue filed March 18, 1930. Serial No. 436,913.

This invention aims to provide an improved shiftable nut device.

In the drawings which illustrate a preferred embodiment of the invention:

Figure 6:
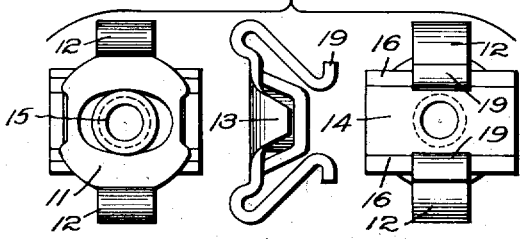
Figure 7:
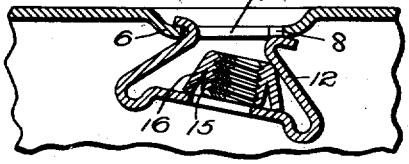

Fig. 6 includes bottom, side, and top views respectively of the shiftable nut device; and Fig. 7 illustrates the manner in which the nut device is secured to the frame part.

Referring to the drawings, there is illustrated a nut device in connection with securing trimming strips to windows and the like. The device illustrated is particularly, though not exclusively, useful in automobile body construction for easily and quickly securing trimming strips of wood or metal to the body.

The installation shown in the drawings includes a metal window frame part or sill support 1 having its exposed surfaces covered with upholstery 2, a glass 3 which may or may not be raised and lowered, a plurality of metal trim or sill strips 4 forming a casing for the glass, shiftable nut devices secured to the frame part and screws 5 for engagement with the nut devices to secure the strips in place.

The frame part 1 is initially prepared for the nut device by forming a depressed portion 6 therein about midway between the glass 3 and the inner edge of the frame. At the bottom of the depressed portion 6 is formed an aperture 7 having opposed notches 8 to receive the nut device as hereinafter described.

Figure 4:
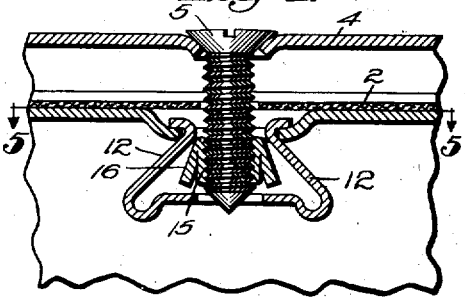
Fig. 4 is a section on the line 4—4 of Fig. 2, being partly in elevation.
Figure 5:
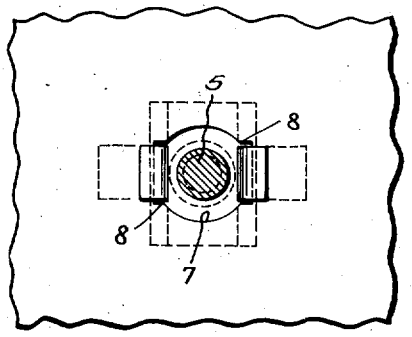
Fig. 5 is a plan section on the line 5—5 of Fig. 4.

The nut device includes a nut holder 9 pressed from a single piece of metal and a nut 10 also pressed from a single piece of metal. The nut holder is provided with a base portion 11 having an aperture extending therethrough, opposed relatively long resilient fingers 12 extending first below the base portion 11 and then sloping toward each other at the opposite side of the base portion. Opposed shorter projections 13 are also formed from the base of the holder and extend in the same general direction as the fingers 12, as best illustrated in Fig. 6. The nut 10 has a base 14 from which is pressed a boss 15 screw-threaded on the inside for reception of a screw 5. Parallel diverging flanges 16 extend from the base 15 and are presented at two sides of the nut. These flanges 16 terminate in substantially the same plane as the end of the boss 15 as illustrated in Fig. 4, and provide guides for the nut.

The nut unit is assembled at the point of manufacture and while the nut is shiftable relative to the holder it is held in assembled relation therewith by the fingers 12 which overlie the nut sufficiently to prevent its becoming disengaged therefrom. The aperture in the base 11 of the nut holder is larger than the boss, but the boss is prevented from entering the aperture and interfering with the operation of the nut by the flanges 16 which span the aperture and guide the nut along the base portion 11 of the holder as illustrated in Fig. 6.

The trim strip 4 is formed from a single piece of metal and is provided with a plurality of screw receiving apertures 17 surrounded by tapered walls 18 to provide for countersinking the heads of the screws 5.

Figure 1:
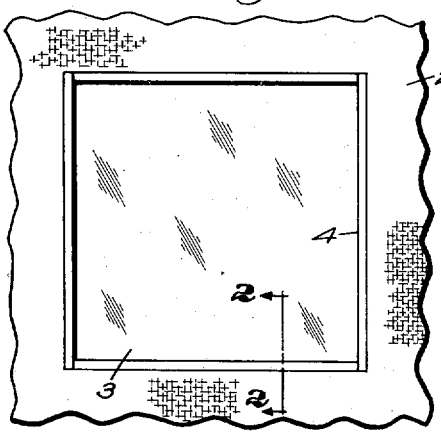
Fig. 1 is an elevation view of a window, part of the surrounding frame being broken away.
Figure 2:
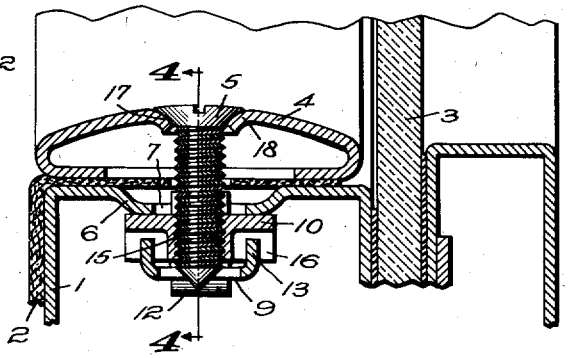
Fig. 2 is an enlarged section on the line 2—2 of Fig. 1, being partly in elevation and showing the trim or sill strip spaced away from the glass.
Figure 3:
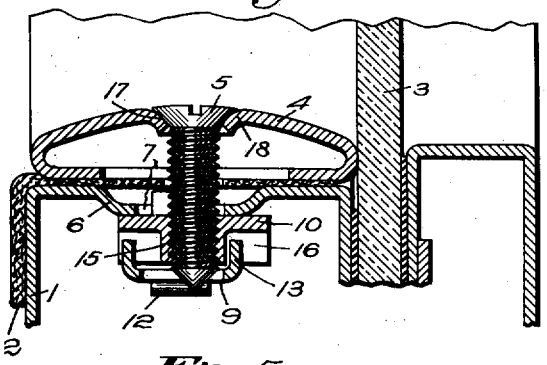
Fig. 3 is a section similar to Fig. 2, but showing the trim strip pressed against the glass.

Assembly of the installation may be effected by first securing the nut unit to the frame part 1. This may be accomplished by entering one of the fingers 12, which may or may not be contractible and expansible, into one of the notches 8 at one side of the aperture 7 so that a hook-shaped portion 19 formed at the end of the finger may hook over the outer face of the frame part 1 in the depressed portion 6 as illustrated in Fig. 7. Then the other finger may be snapped through the aperture so that its hook-shaped portion 19 may also overlie a portion of the frame part thereby to securely hold the device in place relative to the frame part 1. When thus secured to the frame the holder is held against rotation by cooperation between the slots 8 and the fingers 12 while the nut which is generally rectangular in outline, is held against rotation by the fingers 12 and the projections 13. The nut is free to shift transversely in all directions relative to the nut holder and the frame 1 and is limited in its movement by cooperation between the flanges 16 of the nut and the fingers 12 and also by cooperation between the boss 15 and the projections 13. After the upholstery 2 has been stretched over the frame 1 the trim strip 4 may be placed over the upholstery and a screw 5 entered in the aperture 17. This screw 5 passes through the upholstery, through the aperture 7 in the depression 6 and enters the threaded boss 15 of the nut. By turning the screw 5 it may be threaded into the boss 15 as best illustrated in Fig. 2. During the screwing together operation, the nut may shift in any transverse direction, as above described, so as to align itself with the screw.

Where the trim strip is used at the edge of a frame, as in the window frame illustrated in the drawings, it is sometimes necessary to shift the strip sidewise so that it may be aligned with the edge of the frame or pressed against the glass as illustrated in Fig. 3. This movement may be greater than the usual shifting movement of the nut for correcting misaligned holes as shown and described in cooperating applications and therefore provision has been made for permitting greater sidewise shifting movement of the nut to provide for movement of the strip. The drawings illustrate the fact that the nut may shift to a greater extent toward the projections 13 than toward the fingers 12. Thus the notches 7 at the sides of the apertures are formed lengthwise of the strip so that when the nut unit is secured to the frame 1 the projections 13 are located crosswise of the strip to permit greater shift of the strip in the proper direction as fully illustrated by Figs. 2 and 3.

During the assembling operation of the installation the screws are turned to tighten the nuts but before finally clamping the strip in place it is shifted to its proper relation with the frame and then the screws are given a final twist to clamp the strip tightly against the frame 1 with the upholstery gripped tightly beween them.

While there is shown and described a preferred embodiment of the invention, it will be understood that changes involving omission, alteration, substitution and reversal of parts and even changes in the mode of operation may be made without departing from the scope of the invention, which is best defined in the appended claims.

Claims:

1. A shiftable nut device comprising, in combination, a pressed metal nut holder and a pressed metal nut, said holder having a base portion presenting an aperture therethrough to permit a screw to pass therethrough, opposed fingers extending therefrom and overlying portions of the nut to hold the nut in assembly with the holder, a boss presented by said nut and extending toward the base of the holder, opposed flanges presented by said nut having their edges terminating in substantially the same plane as the end of said boss to prevent entrance of said boss in the aperture provided in the base of the holder and opposed projections extending from the base of said holder to limit the movement of said nut in any direction generally crosswise relative to said fingers.

2. A shiftable nut device comprising, in combination, a pressed metal nut holder and a pressed metal nut, said holder having a base portion presenting an aperture therethrough to permit a screw to pass therethrough, opposed fingers extending therefrom and overlying portions of the nut to hold the nut in assembly with the holder, at least one of said fingers being contractible and expansible, a boss presented by said nut and extending toward the base of the holder, opposed flanges presented by said nut having their edges terminating in substantially the same plane as the end of said boss to prevent entrance of said boss in the aperture provided in the base of the holder and opposed projections extending from the base of said holder to limit the movement of said nut in any direction generally crosswise relative to said fingers.

3. A trimming installation comprising, in combination, a frame part, a nut holder having yieldable means snapped into engagement with said frame part to hold the nut in position, a threaded nut normally assembled with said nut holder, means holding the nut in assembled relation with said holder while permitting it to shift in any lateral direction relative to the said nut holder, a trim strip and a screw passing through said trim strip and having its shank threaded into engagement with said nut to secure said trim strip to said frame part, said shiftable nut permitting shifting of the trim strip in any direction for alignment thereof with the frame part.

4. A trimming installation comprising, in combination, a frame part, a nut holder having yieldable means snapped into engagement with said frame part to hold the nut in position, a threaded nut normally assembled with said nut holder, means provided partly by the nut and partly by the nut holder whereby the nut is held in assembled relation with and is also permitted to shift in any lateral direction relative to the said nut holder, a trim strip and a screw passing through said trim strip and having its shank threaded into engagement with said nut to secure said trim strip to said frame part, said shiftable nut permitting shifting of the trim strip in any direction for alignment thereof with the frame part.

5. A shiftable nut fastening device including a nut holder having a base and resilient means extending therefrom for engagement with a suitable support, a nut assembled in shiftable relation with said nut holder, said nut having a base spaced from the base of the said holder and relatively short lugs extending from the base of said holder toward the base of said nut to provide means for limiting crosswise movement of said nut relative to said resilient means.

UNITED-CARR FASTENER CORPORATION,
*Assignee of Fred S. Carr, Deceased.*
By PRESTON UPHAM,
*Vice President.*